(12) United States Patent
Fukumaru et al.

(10) Patent No.: US 10,135,375 B2
(45) Date of Patent: Nov. 20, 2018

(54) ROTATION CONTROLLER FOR AC ELECTRIC MOTOR AND METHOD FOR CONTROLLING ROTATION OF THE AC ELECTRIC MOTOR

(71) Applicant: KABUSHIKI KAISHA YASKAWA DENKI, Kitakyushu-shi (JP)

(72) Inventors: Shingo Fukumaru, Kitakyushu (JP); Keita Shimamoto, Kitakyushu (JP); Shinya Morimoto, Kitakyushu (JP)

(73) Assignee: KABUSHIKI KAISHA YASKAWA DENKI, Kitakyushu-shi (JP)

( * ) Notice: Subject to any disclaimer, the term of this patent is extended or adjusted under 35 U.S.C. 154(b) by 0 days.

(21) Appl. No.: 15/461,485

(22) Filed: Mar. 17, 2017

(65) Prior Publication Data

US 2017/0272018 A1 Sep. 21, 2017

(30) Foreign Application Priority Data

Mar. 18, 2016 (JP) ................. 2016-056035

(51) Int. Cl.
*H02P 6/16* (2016.01)
*H02P 21/22* (2016.01)
(Continued)

(52) U.S. Cl.
CPC ........ *H02P 21/22* (2016.02); *H02M 7/53873* (2013.01); *H02P 6/14* (2013.01); *H02P 27/08* (2013.01)

(58) Field of Classification Search
CPC .. H02P 6/16; H02P 9/009; H02P 21/18; H02P 21/24; H02P 25/026; H02P 25/089; H02P 2203/01

See application file for complete search history.

(56) References Cited

U.S. PATENT DOCUMENTS 9,774,284 B2 * 9/2017 Liu ........................... H02P 6/18
2002/0171389 A1 * 11/2002 Nakazawa .............. H02P 6/085
318/811
(Continued)

FOREIGN PATENT DOCUMENTS

JP 08-186985 7/1996
JP 08-205578 8/1996
(Continued)

OTHER PUBLICATIONS

Japanese Office Action for corresponding JP Application No. 2016-056035, dated Mar. 6, 2018 (w/ English machine translation).

*Primary Examiner* — Bickey Dhakal
(74) *Attorney, Agent, or Firm* — Mori & Ward, LLP

(57) ABSTRACT

A rotation controller for an AC electric motor includes a space vector generator, a current change ratio obtainer, and a rotational angle calculator. The space vector generator generates at least a first magnetic field in a first direction and a second magnetic field in a second direction crossing the first direction in a rotation plane of a saliency-exhibiting rotor. The space vector generator synthesizes the first magnetic field and the second magnetic field into a synthesized magnetic field. The current change ratio obtainer acquires a first current change ratio of a first current generated in the first direction in a stator and a second current change ratio of a second current generated in the second direction in the stator. The rotational angle calculator calculates a rotational angle of the saliency-exhibiting rotor based on at least the first and second current change ratios and the first and second directions.

15 Claims, 9 Drawing Sheets

(51) Int. Cl.
*H02P 6/14* (2016.01)
*H02P 27/08* (2006.01)
*H02M 7/5387* (2007.01)

(56) References Cited

U.S. PATENT DOCUMENTS

| | | |
|---|---|---|
| 2005/0146306 A1 | 7/2005 | Ha et al. |
| 2005/0269982 A1 | 12/2005 | Coles et al. |
| 2013/0229135 A1* | 9/2013 | Long .................. H02P 21/13 318/400.34 |
| 2014/0327380 A1* | 11/2014 | Magee .................. H02P 6/18 318/400.32 |
| 2014/0346984 A1* | 11/2014 | Shiota .................. H02P 6/183 318/400.02 |
| 2015/0372629 A1* | 12/2015 | Huang .................. H02P 21/13 318/400.02 |

FOREIGN PATENT DOCUMENTS

| | | |
|---|---|---|
| JP | 2003-299381 | 10/2003 |
| JP | 2005-537774 | 12/2005 |
| WO | WO 2013/124991 | 8/2013 |

* cited by examiner

Pattern 1

Pattern 2

Pattern 3

Pattern 1

Pattern 2

Pattern 3

ROTATION CONTROLLER FOR AC ELECTRIC MOTOR AND METHOD FOR CONTROLLING ROTATION OF THE AC ELECTRIC MOTOR

CROSS-REFERENCE TO RELATED APPLICATIONS

The present application claims priority under 35 U.S.C. § 119 to Japanese Patent Application No. 2016-056035, filed Mar. 18, 2016. The contents of this application are incorporated herein by reference in their entirety.

BACKGROUND

Field of the Invention

The embodiments disclosed herein relate to a rotation controller for an AC electric motor and a method for controlling rotation of the AC electric motor.

Discussion of the Background

In order to control the rotation of IPM (Interior Permanent Magnet) motors or perform what is called vector control (field-oriented control) of AC electric motors, it is necessary to know the rotational angle (current position) of the rotor. A commonly known method to know the rotational angle of the rotor is to provide the rotor with a sensor to detect its rotational angle. Another method to know the rotational angle of the rotor is "sensor-less" technology, which is in development and utilizes information obtained from a rotation controller for an AC electric motor.

For example, Japanese Unexamined Patent Application Publication No. 2003-299381A1 discloses obtaining the rotational angle of the rotor of a motor in a high-speed rotation region of the motor using a state observer that uses a numerical-formula model of an AC electric motor. A commonly known method to know the rotational angle of the rotor in a low-speed rotation region of the motor is to superpose a high frequency over the output frequency of the electric motor and use a resulting response to know the rotational angle of the rotor.

Japanese Unexamined Patent Application Publication No. 8-205578A1 discloses a device for detecting the magnetic pole position of a motor that has an electrical saliency based on the amount of change of output current ripple of an inverter in a switching period of PWM control and based on the amount of change of a time integration value of output voltage.

SUMMARY

According to one aspect of the present disclosure, a rotation controller for an AC electric motor includes a space vector generator, a current change ratio obtainer, and a rotational angle calculator. The space vector generator generates at least a first magnetic field in a first direction and a second magnetic field in a second direction crossing the first direction in a rotation plane of a saliency-exhibiting rotor of the AC electric motor. The space vector generator synthesizes the first magnetic field and the second magnetic field into a synthesized magnetic field so as to generate a space vector of the synthesized magnetic field. The current change ratio obtainer acquires a first current change ratio of a first current generated in the first direction in a stator of the AC electric motor and a second current change ratio of a second current generated in the second direction in the stator. The rotational angle calculator calculates a rotational angle of the saliency-exhibiting rotor based on at least the first current change ratio, the second current change ratio, the first direction, and the second direction.

According to another aspect of the present disclosure, a method for controlling rotation of an AC electric motor includes generating at least a first magnetic field in a first direction and a second magnetic field in a second direction crossing the first direction in a rotation plane of a saliency-exhibiting rotor of the AC electric motor. The first magnetic field and the second magnetic field are synthesized into a synthesized magnetic field so as to generate a space vector of the synthesized magnetic field. A first current change ratio of a first current generated in the first direction in a stator of the AC electric motor and a second current change ratio of a second current generated in the second direction in the stator are acquired. A rotational angle of the saliency-exhibiting rotor is calculated based on at least the first current change ratio, the second current change ratio, the first direction, and the second direction.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
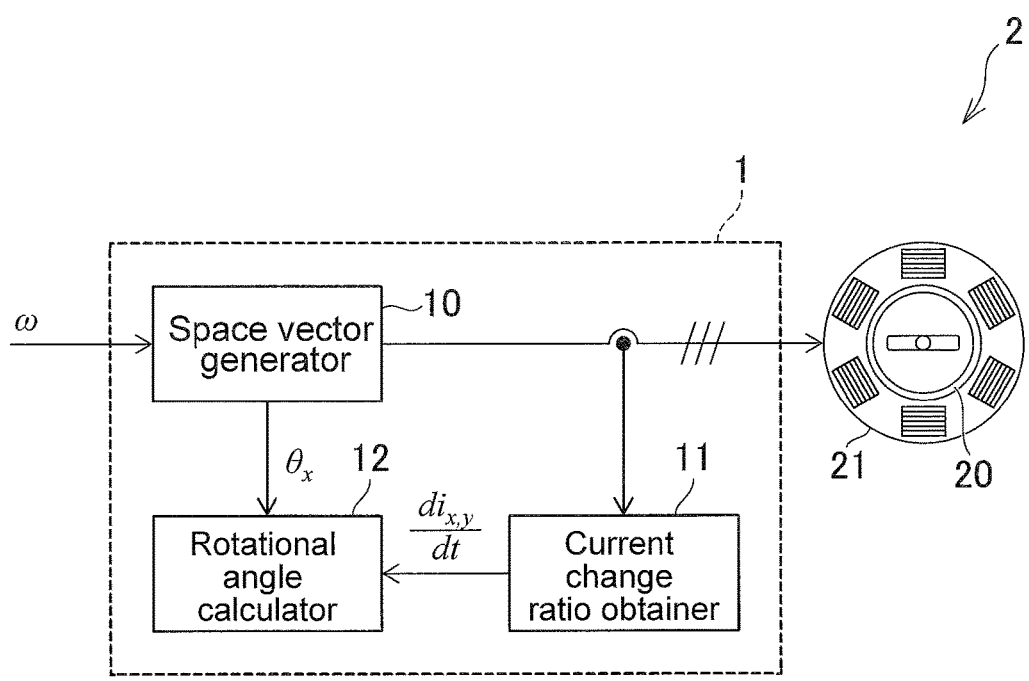
FIG. 1 schematically illustrates a configuration of a rotation controller according to a first embodiment and a configuration of an AC electric motor connected to and controlled by the rotation controller.

The embodiments will now be described with reference to the accompanying drawings, wherein like reference numerals designate corresponding or identical elements throughout the various drawings.

The first embodiment will be described by referring to FIGS. 1 to 5.

Figure 8:
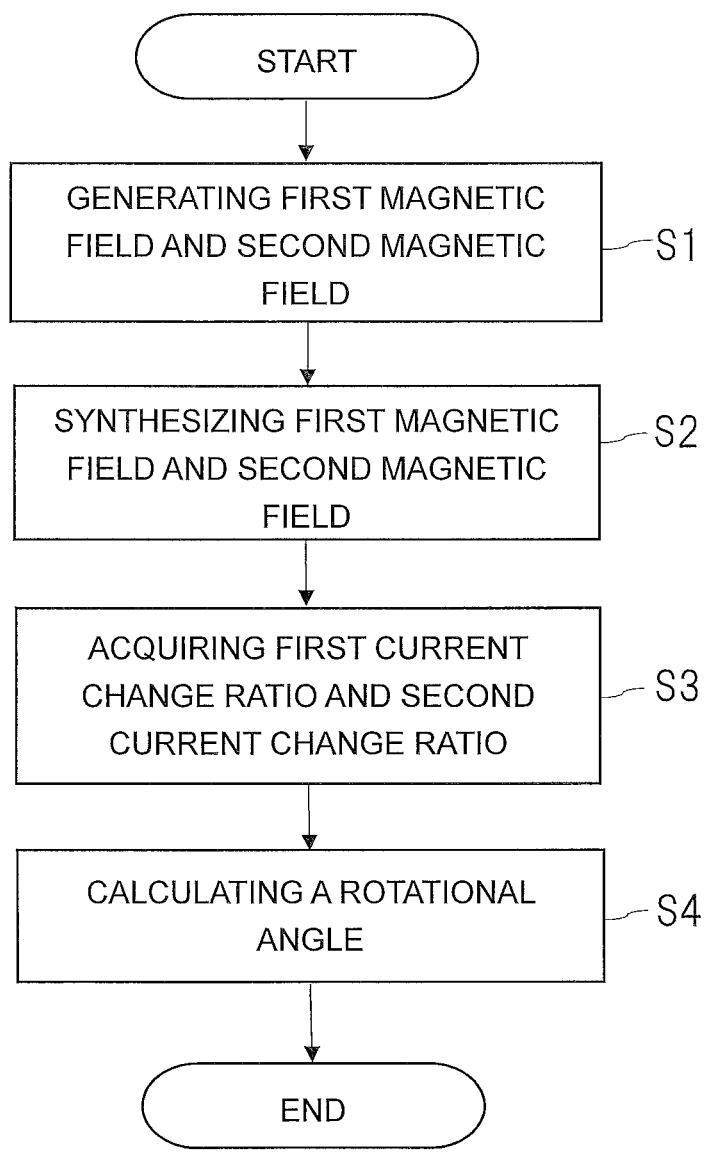
FIG. 8 illustrates a flow chart to explain an operation of the rotation controller.

FIG. 1 schematically illustrates a configuration of a rotation controller 1 according to the first embodiment and a configuration of an AC (alternating-current) electric motor 2, which is connected to and controlled by the rotation controller 1. FIG. 8 illustrates a flow chart to explain an operation of the rotation controller.

The rotation controller 1, in response to a speed command ω, causes an AC current that complies with the type of the AC electric motor 2 to be generated through the winding coils of the stator, 21, of the AC electric motor 2 so as to make the rotor, 20, of the AC electric motor 2 rotate at desired speeds. In this embodiment, the winding coils of the stator 21 of the AC electric motor 2 are three-phase winding coils. The rotation controller 1, therefore, outputs three-phase alternating-currents to the stator 21. In the following description, the three phases will be referred to as u phase, v phase, and w phase with u axis, v axis, and w axis being drawn respectively in the directions of the u phase, the v phase, and the w phase. The AC electric motor 2 will not be limited to the three-phase configuration. Other examples include, but are not limited to, a two-phase configuration, a four-phase configuration, and more-than-four phase configurations.

The rotor 20 has a saliency. That the rotor 20 has a saliency means that the rotor 20 has a difference in inductance. Specifically, an orthogonal coordinate system fixed to the rotor 20 is drawn within a rotation plane of the rotor 20 with the origin of the orthogonal coordinate system being at the rotation axis of the rotor 20 and with the two orthogonal axes of the orthogonal coordinate system being assumed as d-axis and q-axis. In this orthogonal coordinate system, there is a difference between inductance $L_d$, which is in the d-axis direction of the rotor 20, and inductance $L_q$, which is in the q-axis direction of the rotor 20. The orthogonal coordinate system fixed to the rotor 20 rotates synchronously with the rotation of the rotor 20, which means that, from the stator 21's standpoint, the d-axis and the q-axis rotate together with the rotation of the rotor 20. In this embodiment, the d-axis is oriented in the direction of a flux that passes through the rotor 20. As used herein, the rotation plane of the rotor 20 refers to any plane that is orthogonal to the direction of the rotation axis of the rotor 20. While in this embodiment the AC electric motor 2 is assumed to be an Interior Permanent Magnet (IPM) motor, this is not intended as limiting the type of the AC electric motor 2; a synchronous motor, an induction motor, or any other type of motor is possible insofar as the rotor 20 has a saliency.

The rotation controller 1 includes a space vector generator 10, a current change ratio obtainer 11, and a rotational angle calculator 12. The space vector generator 10, in response to the speed command CD, performs what is called space vector control to generate rotational magnetic fields that cause the rotor 20 to rotate at desired speeds. Specifically, the space vector generator 10 generates magnetic fields in at least two directions that cross each other on the rotation plane of the rotor 20 (see a step S1 in FIG. 8). The space vector generator 10 generates such magnetic fields in every cycle that is sufficiently shorter than one rotation cycle of the rotor 20. Then, the space vector generator 10 synthesizes the magnetic fields into a synthesized magnetic field, and generates a space vector of the synthesized magnetic field (see a step S2 in FIG. 8), the space vector having a direction and a magnitude that are necessary at a moment in each control cycle. There is a correlation among the magnitude of the magnetic fields caused by the winding coils of the stator 21 of the AC electric motor 2, the period of time for which voltage is applied to each of the winding coils, and the value of current caused to occur through each of the winding coils. The magnitude, the period of time, and the value of current can be represented by space vectors on an α-β plane that represents the rotation plane of the rotor 20. The α-β plane is an orthogonal coordinate system drawn within the rotation plane of the stator 21 and fixed to the stator 21 with the origin of the orthogonal coordinate system being at the rotation axis of the rotor 20 and with the two orthogonal axes being assumed as α axis and β axis. In the following description, the magnitude, the period of time, and the value of current will occasionally be referred to as space magnetic field vector, space voltage vector, and space current vector, respectively, where the magnitude, the period of time, and the value of current need to be thus distinguished from each other. The space vector generator 10 according to this embodiment is what is called a PWM (Pulse Width Modulation) controller, which converts DC (direct-current) voltage into three-phase AC voltage using a pulse width converter and a voltage source inverter. PWM, however, is not intended as limiting how to generate space vectors.

The current change ratio obtainer 11 obtains the change ratio, $di_{x,y}/dt$, of the current caused to occur on the stator 21 for the direction of each magnetic field generated by the space vector generator 10 (see a step S3 in FIG. 8), and forwards the change ratio $di_{x,y}/dt$ to the rotational angle calculator 12, described later. When the direction of the magnetic field generated by the space vector generator 10 matches any one of the direction of the u axis, the direction of the v axis, and the direction of the w axis, the current change ratio obtainer 11 obtains the change ratio of the current caused to occur through the winding coil of each of the phases. When the direction of the magnetic field generated by the space vector generator 10 does not match any of the direction of the u axis, the direction of the v axis, or the direction of the w axis, the current change ratio obtainer 11 obtains the change ratio of the magnitude of a space current vector obtained by converting the current caused to occur through the winding coil of each phase. The subscript x denotes the direction of the magnetic field generated by the space vector generator 10, and the subscript y denotes the α axis direction or the β axis direction.

The rotational angle calculator 12 calculates the rotational angle, θ, of the rotor 20 at least based on $di_{x,y}/dt$, which is the change ratio of the current caused to occur on the stator 21, and based on the direction, $θ_x$, of the magnetic field generated by the space vector generator 10 (see a step S4 in FIG. 8). The obtained rotational angle θ may be returned to the space vector generator 10 to be used in the control performed by the space vector generator 10, or may be output to an external device. A possible example of usage of the rotational angle θ in an external device is to obtain the change ratio of the rotational angle θ based on the rotational speed of the rotor 20. Another possible example is to control the rotational angle θ of the rotor 20 to use the AC electric motor 2 as a servo motor.

With the above-described configuration of the rotation controller 1 according to this embodiment, the rotational angle θ of the rotor 20, which as a saliency, of the AC electric motor 2 is obtained in a sensor-less manner using the current change ratio obtainer 11 and the rotational angle calculator 12. In low-speed rotation regions of the AC electric motor 2, where it is difficult to obtain the rotational angle of the rotor using a state observer, the rotation controller 1 according to this embodiment enables the rotational angle θ of the rotor 20 to be obtained without the need for an additional configuration to apply a waveform, such as a high-frequency waveform, different from the drive waveform to the AC electric motor 2. Additionally, the current change ratio obtainer 11 obtains change ratios $di_{x,j}/dt$ for only the directions of the two magnetic fields generated by the space vector generator 10. This configuration keeps the calculation load on the rotational angle calculator 12 at practical levels.

Figure 9:
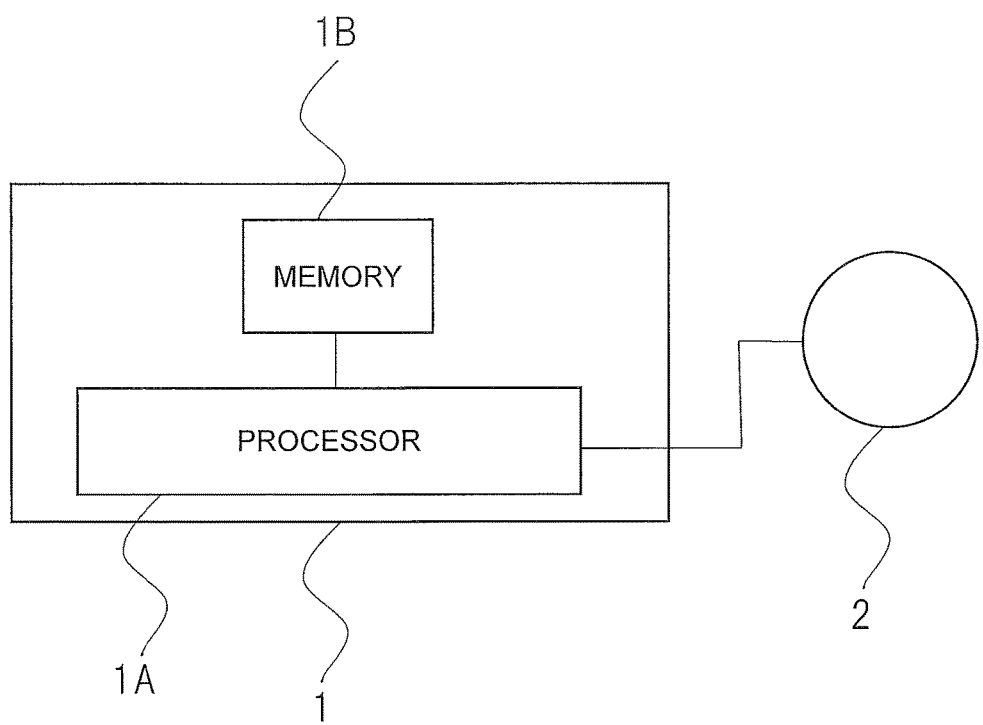
FIG. 9. illustrates a configuration of the rotation controller.

As seen in FIG. 9, the rotation controller 1 is constituted as a microcomputer and includes a processor 1A and a memory 1B. The processor 1A includes a central processing unit (CPU). The memory 1B includes a read only memory (ROM) and a random access memory (RAM). For example, a program stored in the memory 1B is read into the processor 1A, and thereby functions of the rotation controller 1 (functions of the space vector generator 10, the current change ratio obtainer 11, and the rotational angle calculator 12) are performed. The processor 1A is connected to the AC electric motor 2. A specific method of calculating the rotational angle θ at the rotational angle calculator 12 according to the first embodiment will be described.

In the first embodiment, the space vector generator 10 generates magnetic fields in two adjacent directions among the phase directions of the stator 21 and opposite directions opposite to the phase directions, synthesizes the magnetic fields into a synthesized magnetic field, and generates a space magnetic field vector of the synthesized magnetic field. In a three-phase configuration, the u axis, the v axis, and the w axis are shifted from each other by an angle of 120 degrees. Assuming that the u axis direction is one of the two directions, the other direction adjacent to the u axis direction is an opposite direction opposite to the v axis direction or the w axis direction.

Figure 2:
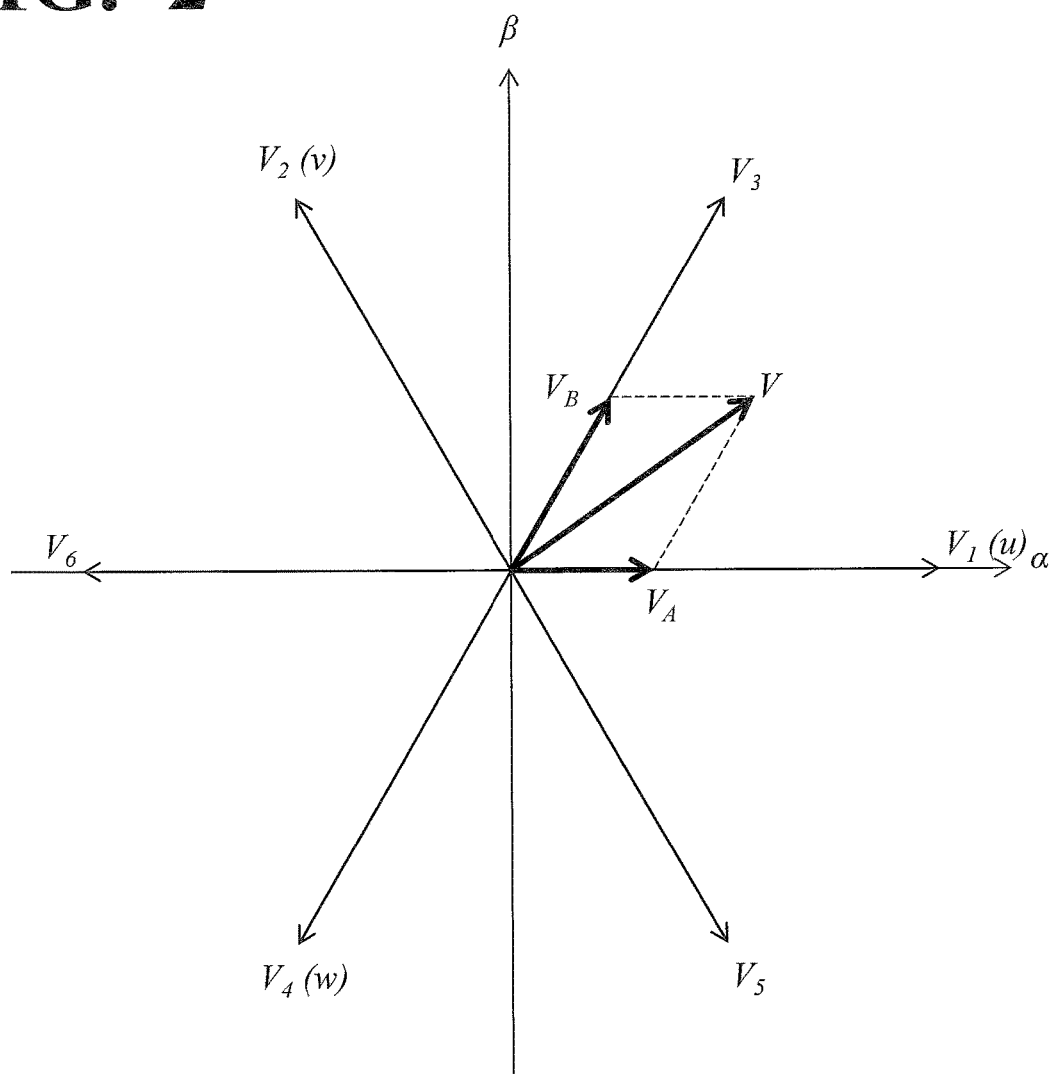
FIG. 2 illustrates voltage vectors $V_1$ to $V_6$, which are generated by a space vector generator according to the first embodiment on an a-fi plane.

FIG. 2 illustrates voltage vectors $V_1$ to $V_6$. The voltage vectors $V_1$ to $V_6$ are generated by the space vector generator 10 on an α-β plane. As illustrated in FIG. 2, the a axis and the u axis are oriented in the same direction, and the voltage vector $V_1$ is oriented in the u axis (=α axis) direction. Also as illustrated in FIG. 2, the voltage vector $V_2$ is oriented in the v axis direction; the voltage vector $V_3$ is oriented in the opposite direction of the w axis direction; the voltage vector $V_4$ is oriented in the w axis direction; the voltage vector $V_5$ is oriented in the opposite direction of the v axis direction; and the voltage vector $V_6$ is oriented in the opposite direction of the u axis direction.

Assume that at one moment in one control cycle, it is necessary to generate space voltage vector V based on a necessary space magnetic field vector. Under this assumption, the space vector generator 10 selects two adjacent voltage vectors, from among the voltage vectors $V_1$ to $V_6$, between which the space voltage vector V is held. The space vector generator 10 regards these voltage vectors as a first direction and a second direction in which to generate magnetic fields. In this embodiment, the voltage vectors are selected in anti-clockwise order. According to this order, the voltage vector $V_1$ direction is selected as the first direction, and the voltage vector the $V_3$ direction is selected as the second direction. Since the voltage vectors $V_1$ to $V_6$ are oriented in any of the u, v, and w axis directions and the opposite directions opposite to the u, v, and w axis directions, the first direction and the second direction are two adjacent directions, among the phase directions of the stator 21 and opposite directions opposite to the phase directions, that cross each other on the α-β plane. The selection from among the voltage vectors $V_1$ to $V_6$ is implemented by a simple configuration to switch on and off the application of voltage to each of the phase winding coils of the stator 21.

While in FIG. 2 the space voltage vector V is in the region held between the voltage vector $V_1$ and the voltage vector $V_3$, the following description also applies in the cases where the space voltage vector V is in any other regions. In the following description, the first direction will be referred to as A direction, and the second direction will be referred to as B direction.

The space vector generator 10 generates voltage vector $V_A$ in the A direction and generates voltage vector $V_B$ in the B direction so as to make the synthesized vector the space voltage vector V. The magnitudes of the voltage vector $V_A$ and the voltage vector $V_B$ may be adjusted by any method, such as by controlling voltage values. In this embodiment, the magnitudes of the voltage vector $V_A$ and the voltage vector $V_B$ are adjusted by time-dividing one cycle and controlling the period of time for which voltage is applied in the A direction and the period of time for which voltage is applied in the B direction, as described later.

As used herein, the one cycle is a period of time during which necessary voltage vectors of the voltage vectors $V_1$ to $V_6$ are output in a particular pattern (that is, in a predetermined order). Generally, the one cycle is approximately identical to what is called control cycle. In this embodiment, therefore, the one cycle is approximately identical to control cycle. In another possible embodiment, necessary voltage vectors of the voltage vectors $V_1$ to $V_6$ may be output in a particular pattern over equal to or more than two control cycles. In this case, the one cycle corresponds to equal to or more than two control cycles.

The one cycle is made up of sub-cycles, denoted as x, which are obtained by time-dividing the one cycle. Specifically, sub-cycle A denotes a period of time for which voltage vector $V_A$ is being output, and sub-cycle B denotes a period of time for which voltage vector $V_B$ is being output.

A voltage equation for the AC electric motor 2 in an α-β coordinate system is as follows.

$$\begin{bmatrix} V_\alpha \\ V_\beta \end{bmatrix} = R\begin{bmatrix} i_\alpha \\ i_\beta \end{bmatrix} + \begin{bmatrix} L+l\cos 2\theta & l\sin 2\theta \\ l\sin 2\theta & L-l\cos 2\theta \end{bmatrix}\frac{d}{dt}\begin{bmatrix} i_\alpha \\ i_\beta \end{bmatrix} + \phi\begin{bmatrix} -\omega_r \sin\theta \\ \omega_r \cos\theta \end{bmatrix} \quad \text{Equation 1}$$

In Equation 1, $V_\alpha$ and $V_\beta$ are respectively an a direction component and a β direction component of the voltage value; $i_\alpha$ and $i_\beta$ are respectively an a direction component and a β direction component of the current value; R is the resistance of the winding coil; θ is the rotational angle of the rotor 20; φ is a constant determined by the winding coil; $\omega_r$ is the rotational angle speed of the rotor 20; and L and l are constants denoting the saliency of the rotor 20. L and l are represented as follows.

$$L = \frac{L_d + L_q}{2}, \; l = \frac{L_d - L_q}{2} \quad \text{Equation 2}$$

The following description will be under the assumption that the AC electric motor 2 is in a low-speed rotation region and a high-frequency component alone is taken into consideration. Under this assumption, R and $\omega_r$ are possibly low enough to make Equation 1 approximatable by the following equation.

$$\begin{bmatrix} V_{h\alpha} \\ V_{h\beta} \end{bmatrix} = \begin{bmatrix} L + l\cos2\theta & l\sin2\theta \\ l\sin2\theta & L - l\cos2\theta \end{bmatrix} \frac{d}{dt} \begin{bmatrix} i_\alpha \\ i_\beta \end{bmatrix} \quad \text{Equation 3}$$

In Equation 3, the subscript h denotes a high-frequency component.

If Equation 3 is developed based on current, the following equation is obtained.

$$\frac{d}{dt} \begin{bmatrix} i_\alpha \\ i_\beta \end{bmatrix} = \frac{1}{L^2 - l^2} \begin{bmatrix} L - l\cos2\theta & -l\sin2\theta \\ -l\sin2\theta & L + l\cos2\theta \end{bmatrix} \begin{bmatrix} V_{h\alpha} \\ V_{h\beta} \end{bmatrix} \quad \text{Equation 4}$$

A coordinate conversion with respect to the sub-cycle A, rotating the A direction to make the A direction match the α axis, results in the following equation.

$$\frac{d}{dt} \begin{bmatrix} i_{A,\alpha} \\ i_{A,\beta} \end{bmatrix} = $$
$$\frac{1}{L^2 - l^2} \begin{bmatrix} L - l\cos(2\theta - 2\theta_A) & -l\sin(2\theta - 2\theta_A) \\ -l\sin(2\theta - 2\theta_A) & L + l\cos(2\theta - 2\theta_A) \end{bmatrix} \begin{bmatrix} V_{A,h\alpha} \\ V_{A,h\beta} \end{bmatrix} \quad \text{Equation 5}$$

In Equation 5, $V_{A,h\beta}$, which is the voltage in the β axis direction, is zero, which results in the following equation.

$$\frac{d}{dt} \begin{bmatrix} i_{A,\alpha} \\ i_{A,\beta} \end{bmatrix} = \frac{V}{L^2 - l^2} \begin{bmatrix} L - l\cos(2\theta - 2\theta_A) \\ -l\sin(2\theta - 2\theta_A) \end{bmatrix} \quad \text{Equation 6}$$

A coordinate conversion in Equation 3 with respect to the sub-cycle B, rotating the B direction to make the B direction match the α axis, similarly to the sub-cycle A, results in the following equation.

$$\frac{d}{dt} \begin{bmatrix} i_{B,\alpha} \\ i_{B,\beta} \end{bmatrix} = $$
$$\frac{1}{L^2 - l^2} \begin{bmatrix} L - l\cos(2\theta - 2\theta_B) & -l\sin(2\theta - 2\theta_B) \\ -l\sin(2\theta - 2\theta_B) & L + l\cos(2\theta - 2\theta_B) \end{bmatrix} \begin{bmatrix} V_{B,h\alpha} \\ V_{B,h\beta} \end{bmatrix} \quad \text{Equation 7}$$

$V_{B,h\beta}$, which is the voltage in the β axis direction, is zero, which results in the following equation.

$$\frac{d}{dt} \begin{bmatrix} i_{B,\alpha} \\ i_{B,\beta} \end{bmatrix} = \frac{V}{L^2 - l^2} \begin{bmatrix} L - l\cos(2\theta - 2\theta_B) \\ -l\sin(2\theta - 2\theta_B) \end{bmatrix} \quad \text{Equation 8}$$

In the above Equations, $\theta_A$ is the angle of the A direction relative to the α axis, and $\theta_B$ is the angle of the B direction relative to the α axis. In Equations 6 and 8, $V_{A,h\alpha}$ and $V_{B,h\alpha}$ are assumed to be the same and denoted collectively as V. It is noted, however, that $V_{A,h\alpha}$ and $V_{B,h\alpha}$ may not necessarily be the same, occasionally leaving some difference referred to as estimated error, and that $V_{A,h\alpha}$ and $V_{B,h\alpha}$ can be made to be the same, eliminating the estimated error, as detailed later.

In Equations 6 and 8, a difference in the α axis component is obtained by the following equation.

$$\frac{di_{A,\alpha}}{dt} - \frac{di_{B,\alpha}}{dt} = \frac{V}{L^2 - l^2} \begin{pmatrix} (L - l\cos(2\theta - 2\theta_A)) - \\ (L - l\cos(2\theta - 2\theta_B)) - \end{pmatrix} \quad \text{Equation 9}$$
$$= \frac{-2Vl}{L^2 - l^2} \sin(2\theta - \theta_A - \theta_B)\sin(\theta_A - \theta_B)$$

Also in Equations 6 and 8, a difference in the β axis component is obtained by the following equation.

$$\frac{di_{A,\beta}}{dt} - \frac{di_{B,\beta}}{dt} = \frac{V}{L^2 - l^2} \begin{pmatrix} (-l\sin(2\theta - 2\theta_A)) - \\ (-l\sin(2\theta - 2\theta_B)) - \end{pmatrix} \quad \text{Equation 10}$$
$$= \frac{2Vl}{L^2 - l^2} \cos(2\theta - \theta_A - \theta_B)\sin(\theta_A - \theta_B)$$

From Equations 9 and 10, the following equation is obtained.

$$\frac{-\left(\dfrac{di_{A,\alpha}}{dt} - \dfrac{di_{B,\alpha}}{dt}\right)}{\dfrac{di_{A,\beta}}{dt} - \dfrac{di_{B,\beta}}{dt}} = -\frac{\dfrac{-2Vl}{L^2 - l^2}\sin(2\theta - \theta_A - \theta_B)\sin(\theta_A - \theta_B)}{\dfrac{2Vl}{L^2 - l^2}\cos(2\theta - \theta_A - \theta_B)\sin(\theta_A - \theta_B)} \quad \text{Equation 11}$$
$$= \tan(2\theta - \theta_A - \theta_B)$$

Using an inverse function of Equation 11, the rotational angle θ of the rotor 20 is obtained represented by the following equation.

$$\theta = \frac{1}{2}\left\{\tan^{-1}\left[\frac{-\left(\dfrac{di_{A,\alpha}}{dt} - \dfrac{di_{B,\alpha}}{dt}\right)}{\dfrac{di_{A,\beta}}{dt} - \dfrac{di_{B,\beta}}{dt}}\right] + \theta_A + \theta_B\right\} \quad \text{Equation 12}$$

Thus, the above Equations show that by obtaining current change ratios $di_{x,y}/dt$ in the A direction and the B direction in each sub-cycle x, the rotational angle θ of the rotor 20 can be calculated based on the current change ratios, based on the angle $\theta_y$ of the A direction relative to the α axis, and based on the angle $\theta_y$ of the B direction relative to the α axis.

In some cases, voltage vectors may decrease in magnitude, such as when a lower level of output is required of the AC electric motor 2 and the average voltage vector is in a region adjacent to the origin (zero vector) or such as in a region near the points of switch of the voltage vectors on both sides of the space voltage vector V illustrated in FIG. 2. Depending on the performance of the detector, the decrease in magnitude of the voltage vectors may cause the accuracy of obtaining the current change ratio $di_{x,y}/dt$ to be deteriorated, making the rotational angle θ of the rotor 20 less accurate.

In view of this situation, the rotation controller 1 according to this embodiment may generate, within one control cycle, magnetic fields in the third direction and the fourth direction, which are respectively opposite to the first direction and the second direction, in addition to the above-described magnetic fields generated in the first direction and the second direction. In the following description, the third direction and the fourth direction will respectively be referred to as A' direction and B' direction, in relation to the A direction and the B direction, which respectively correspond to the first direction and the second direction.

In this embodiment, the magnitude of the voltage vector $V_x$ is controlled based on the application time period obtained by time-dividing one control cycle. The ratio of the application time period to one control cycle, that is, duty ratio, will be denoted as $\zeta_x$, and the voltage vectors $V_0$ and $V_7$ are defined as zero vector. The voltage vector $V_0$ indicates that no output is made to the winding coil of any of the u phase, the v phase, and the w phase, and the voltage vector $V_7$ indicates that an output is made to the winding coils of all the u phase, the v phase, and the w phase and that the synthesized magnetic field is zero. By definition, the period of time of one control cycle, T, and the period of time of the sub-cycle x, $t_x$, can be represented as follows.

$$\zeta_x = \frac{t_x}{T} \qquad \text{Equation 13}$$

Obviously, the following can be established.

$$\sum_{k=0}^{7} \zeta_k = 1 \qquad \text{Equation 14}$$

The space voltage vector V can be represented by the following equation, where $V_{xmax}$ denotes the maximum voltage vector in the x direction.

$$V = \sum_{k=0}^{7} \zeta_k V_{kmax} \qquad \text{Equation 15}$$

Figure 3:
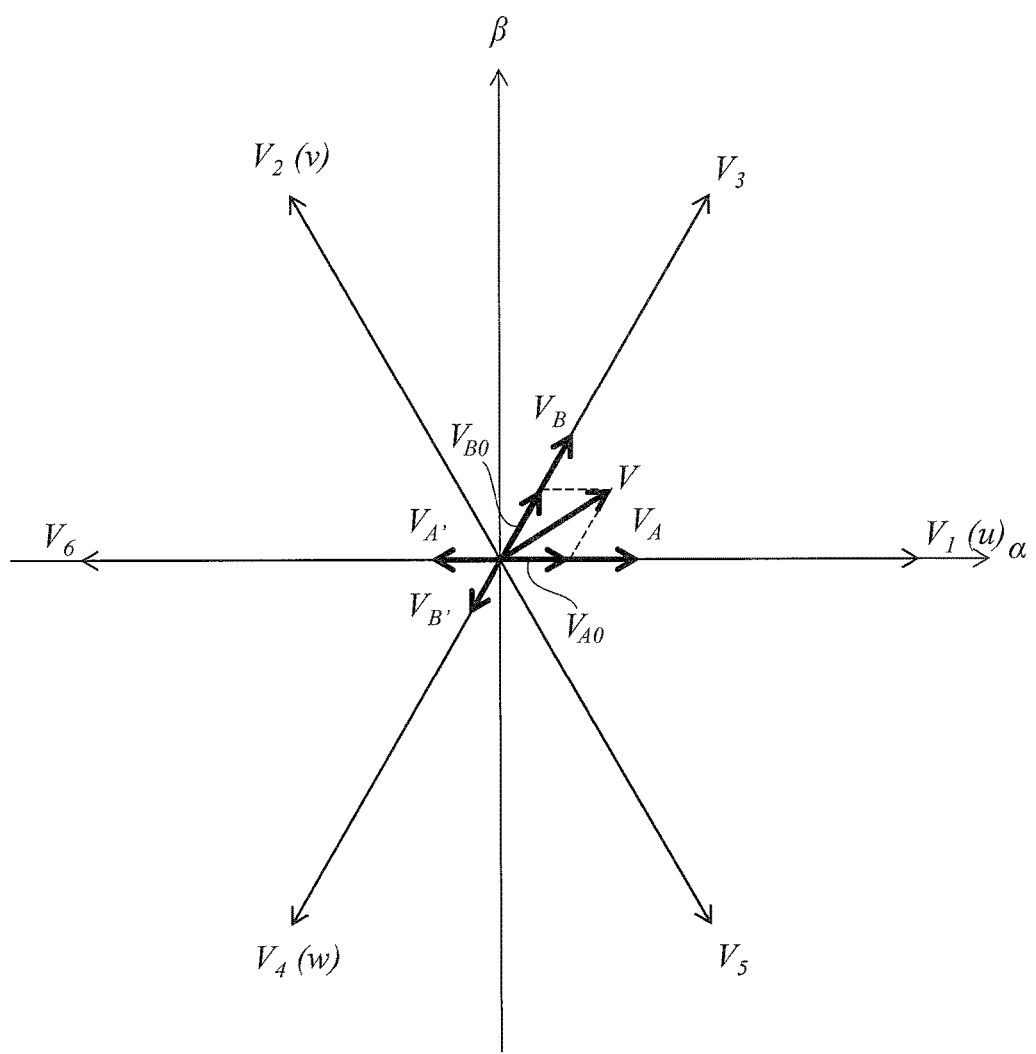
FIG. 3 illustrates voltage vectors $V_A$, $V_A'$, $V_B$, and $V_B'$, which are generated by the space vector generator when space voltage vector V is required.

FIG. 3 illustrates voltage vectors generated by the space vector generator 10 when the space voltage vector V is required, namely, the voltage vector $V_A$, which is in the A direction; the voltage vector $V_A'$, which is in the A' direction, which is opposite to the A direction; the voltage vector $V_B$, which is in the B direction; and the voltage vector $V_B'$, which is in the B' direction, which is opposite to the opposite to the B direction.

In the following description, the space voltage vector V is decomposed into $V_{A0}$ and $V_{B0}$. $V_{A0}$ is a voltage vector component in the A direction, and $V_{B0}$ is a voltage vector component in the B direction. The space vector generator 10 determines the magnitudes of $V_A$ and $V_A'$ so that the synthesized voltage vector of the voltage vector $V_A$ and the voltage vector $V_A'$ becomes $V_{A0}$. The space vector generator 10 also determines the magnitudes of $V_B$ and $V_B'$ so that the synthesized voltage vector of the voltage vector $V_B$ and the voltage vector $V_B'$ becomes $V_{B0}$. This configuration can be represented by the following equation.

$$V_A + V_{A'} + V_B + V_{B'} = V_{A0} + V_{B0} = V \qquad \text{Equation 16:}$$

In this configuration, the sum of the voltage application time periods for the opposite directions is controlled to be equal to or longer than a predetermined time period, which can be represented by the following equation, where x' denotes a direction opposite to direction x.

$$\zeta_x + \zeta_{x'} \geq \zeta_{th} \qquad \text{Equation 17:}$$

In Equation 17, $0 < \zeta_{th} \leq 0.5$. This indicates that the level of the voltage vector difference between the voltage vectors in the opposite directions is equal to or higher than a predetermined level. Specifically, referring to FIG. 3, the voltage vector difference between the voltage vector $V_A$ and the voltage vector $V_A'$, that is, the magnitude of the voltage vector connecting the leading ends of the voltage vector $V_A$ and the voltage vector $V_A'$ is equal to or more than $\zeta_{th}$ times the magnitude of the maximum voltage vector. This also applies in the voltage vector difference between the voltage vector $V_B$ and the voltage vector $V_B'$.

In this embodiment, $\zeta_x$ and $\zeta_x'$ are determined so that $\zeta_{th} = 0.5$, that is, the sum of the voltage application time periods for the opposite directions is half one control cycle.

$\zeta_x$ and $\zeta_x'$ are obtained by the following equation, where $\zeta_{x0}$ denotes a duty for obtaining voltage vector $V_{x0}$, which is obtained when a space voltage vector is decomposed into two directions including the x direction.

$$\zeta_x = \zeta_{x0} + \frac{\zeta_{th} - \zeta_{x0}}{2} = \frac{1}{4} + \frac{\zeta_{x0}}{2}, \zeta_{x'} = \frac{\zeta_{th} - \zeta_{x0}}{2} = \frac{1}{4} - \frac{\zeta_{x0}}{2} \qquad \text{Equation 18}$$

Equation 18 is used to obtain the synthesized vector of the voltage vectors that the space vector generator 10 generates in the A direction, the A' direction, the B direction, and the B' direction.

$$\zeta_A V_{Amax} + \zeta_{A'} V_{A'max} + \zeta_B V_{Bmax} + \qquad \text{Equation 19}$$

$$\zeta_{B'} V_{B'max} = \left[\left(\frac{1}{4} + \frac{\zeta_{A0}}{2}\right) - \left(\frac{1}{4} - \frac{\zeta_{A0}}{2}\right)\right]$$

$$V_{Amax} + \left[\left(\frac{1}{4} + \frac{\zeta_{B0}}{2}\right) - \left(\frac{1}{4} - \frac{\zeta_{B0}}{2}\right)\right] V_{Bmax} =$$

$$\zeta_{A0} V_{Amax} + \zeta_{B0} V_{Bmax} = V_{A0} + V_{B0} = V$$

This proves that the desired space voltage vector V is obtained.

As can be seen from FIG. 3, the amount of change in a voltage vector in an x direction (either the A direction or the B direction) is the difference between this voltage vector and a voltage vector in the opposite direction of x' direction, and can be represented by the following equation.

$$V_x - V_{x'} \geq \zeta_{th} V_{xmax} = \tfrac{1}{2} V_{max} \qquad \text{Equation 20:}$$

Equation 20 indicates that the difference is equal to or more than $C_{th}$ times the maximum value of the voltage vector; specifically, equal to or more than half the maximum value. This ensures that the momentary current change ratio $di_{x,y}/dt$ within one control cycle is large enough to maintain the accuracy of obtaining the rotational angle θ.

While $V_x$ and $V_x'$ are controlled so that $V_x - V_x' = \zeta_{th} V_{xmax}$, the level of the voltage vector difference between the voltage vector $V_A$, which is in the A direction, and $V_A'$, which is in the opposite direction of the A direction, is equal to $\zeta_{th}$ times $V_{xmax}$, and the level of the voltage vector difference between the voltage vector $V_B$, which is in the B direction, and $V_B'$, which is in the opposite direction of the B direction, is equal to $\zeta_{th}$ times $V_{xmax}$. These voltage vector differences are equal to each other, which can be represented as $\zeta_A + \zeta_A' = \zeta_B + \zeta_B'$. Here, $\zeta_A + \zeta_A'$ is constant, making $V_{A,\,h\alpha} = V_{B,\,h\alpha} = V$ in Equations 6 and 8 hold true. This configuration eliminates the estimated error that is otherwise involved in the calculation of the rotational angle θ of the rotor 20 based on the current change ratios $di_{x,y}/dt$ in the A direction and the B direction and based on the angles $θ_y$ of the A direction and the B direction relative to the α axis. As a result, the accuracy of obtaining the rotational angle θ improves. Also in the above configuration, the following equation holds true.

$$\zeta_A + \zeta_{A'} + \zeta_B + \zeta_{B'} =$$ Equation 21
$$\left(\frac{1}{4} + \frac{\zeta_{A0}}{2}\right) + \left(\frac{1}{4} - \frac{\zeta_{A0}}{2}\right) + \left(\frac{1}{4} + \frac{\zeta_{B0}}{2}\right) + \left(\frac{1}{4} - \frac{\zeta_{B0}}{2}\right) = 1$$

Equation 21 indicates that no voltage vectors are necessary other than the voltage vectors in the A direction, the A' direction, the B direction, and the B' direction. That is, the space vector generator 10 has four kinds of voltage vectors to output within one control cycle, and need not output zero-voltage vector in this embodiment. This configuration reduces the number of the switching operations that the space vector generator 10 performs to switch on and off application of voltage to each of the phase winding coils of the stator 21 within one control cycle.

Japanese Unexamined Patent Application Publication No. 8-205578A1 discloses that the device for detecting the magnetic pole position of a motor divides one PWM cycle into four sections including two zero-vector sections, and in each section, switches on and off application of voltage to each of the phases of the motor (see FIG. 1 and other drawings of JP8-205578A1). If the configuration of the first embodiment were to be implemented in JP8-205578A1, that is, four or more vector sections without non-zero-vector sections were to be implemented in JP8-205578A1, the switching operation would be complicated and needed to be performed a larger number of times within one PWM cycle.

Figure 4:
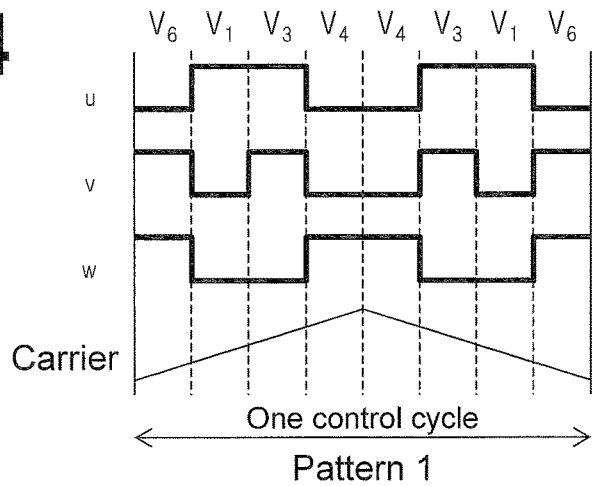
FIG. 4 illustrates, in comparison with a triangular wave carrier, exemplary patterns of voltages applied to winding coils of the u phase, the v phase, and the w phase in one control cycle, where A direction is $V_1$ direction and B direction is the $V_3$ direction.
Figure 4:
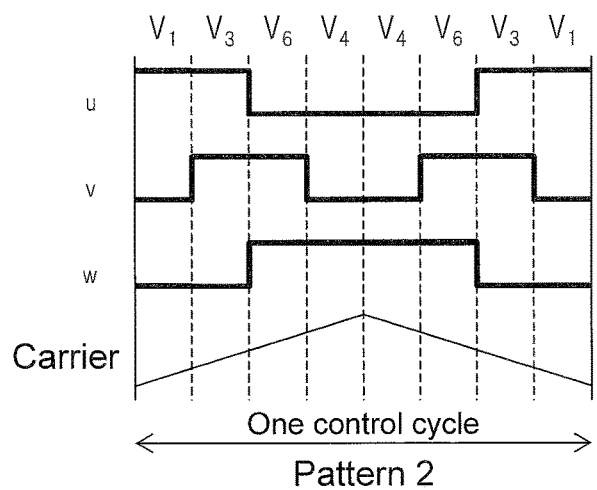
Figure 4:
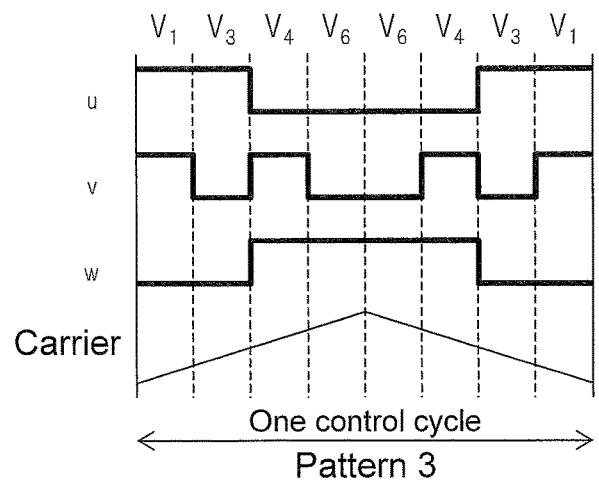

FIG. 4 illustrates, in comparison with a triangular wave carrier, exemplary patterns of voltages applied to the winding coils of the u phase, the v phase, and the w phase in one control cycle, where the A direction is $V_1$ direction and the B direction is the $V_3$ direction. As illustrated in FIG. 4, there are three patterns, 1 to 3, in the voltage application, with those patterns that are approximate or similar to any of patterns 1 to 3 excluded. In this embodiment, there is no need for outputting zero-voltage vectors, namely, $V_0$ and $V_7$, in one control cycle. This configuration eliminates the need for the switching operation for generating zero-voltage vectors, reducing the number of the switching operations as a whole. As illustrated in FIG. 4, one control cycle is divided by broken lines into sections, which correspond to the sub-cycles.

These switching operations correspond to the switching on and off of the transistors in the voltage source inverter of the space vector generator 10. The switching on and off of the transistors involves a loss (what is called switching loss), and therefore, the efficiency of switching increases as the number of the switching operations within one control cycle reduces. In this respect, the rotation controller 1 according to this embodiment reduces the switching loss, increasing the efficiency of switching.

As seen from FIG. 4, patterns 1 to 3 are different from each other in the number of the switching operations. It is where the output in each phase is switched between ON and OFF that a switching operation is necessary. Specifically, 14 switching operations are necessary in pattern 1, 8 switching operations are necessary in pattern 2, and 10 switching operations are necessary in pattern 3. Thus, the number of the switching operations varies depending on the pattern of order in which voltage vectors are output. Pattern 2 is smallest in the number of the switching operations, where the switching loss is minimal. In pattern 2, after the application of voltage to each of the phase winding coils has been switched between a first sub-cycle and a second sub-cycle next to the first sub-cycle, the application of voltage remains unswitched between the second sub-cycle and a third sub-cycle next to the second sub-cycle. Specifically, assuming that a switching operation has been performed in a phase between adjacent sub-cycles (for example, between the sub-cycle 1 and the sub-cycle 3 in the v phase), no switching operation is performed between the latter sub-cycle and the sub-cycle next to the latter sub-cycle (that is, the voltage remains being applied between the sub-cycle 3 and the sub-cycle 6). Selecting this pattern 2 enables the space vector generator 10 to generate voltage vectors in the first to fourth directions while reducing the switching loss.

Figure 5:
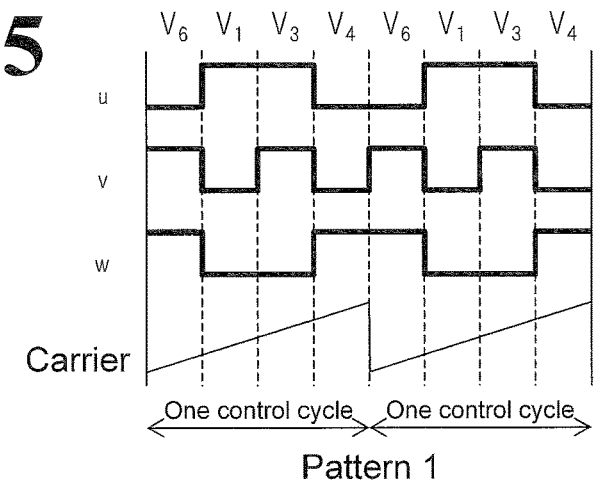
FIG. 5 illustrates, in comparison with a sawtooth waveform carrier, exemplary patterns of voltages applied to the winding coils of the u phase, the v phase, and the w phase in one control cycle, where A direction is $V_1$ direction and B direction is the $V_3$ direction.
Figure 5:
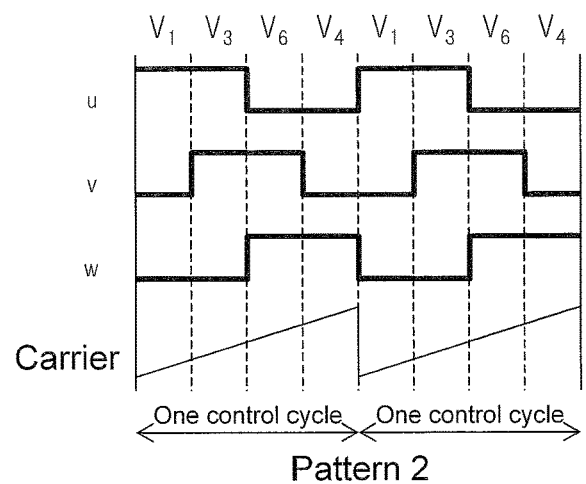
Figure 5:
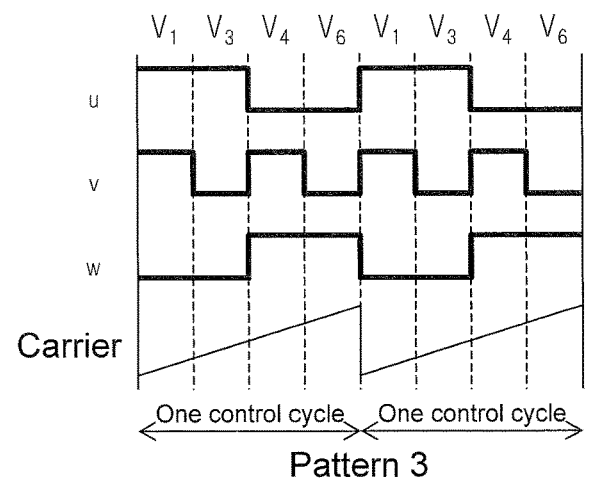

FIG. 5 illustrates, in comparison with a sawtooth waveform carrier, exemplary patterns of voltages applied to the winding coils of the u phase, the v phase, and the w phase in one control cycle, where A direction is $V_1$ direction and B direction is the $V_3$ direction. FIG. 5 is similar to the case of triangular wave carrier illustrated in FIG. 4 in that zero-voltage vectors are not necessary, reducing the number of the switching operations, and in that the number of the switching operations necessary in one control cycle varies depending on the pattern. In the case of sawtooth waveform carrier, 8 switching operations are necessary in pattern 1, 6 switching operations are necessary in pattern 2, and 8 switching operations are necessary in pattern 3. In this case as well, pattern 2 is smallest in the number of the switching operations. In pattern 2, after the application of voltage to each of the phase winding coils has been switched between a first sub-cycle and a second sub-cycle next to the first sub-cycle, the application of voltage remains unswitched between the second sub-cycle and a third sub-cycle next to the second sub-cycle.

There is no limitation to the method of how the current change ratio obtainer 11 obtains current change ratios in the sub-cycles. A non-limiting example of the method, for the purpose of ensuring accuracy in obtaining the average current change ratio in the sub-cycles, is to measure the currents of each of the winding coils at the timings of switching between the sub-cycles illustrated in FIG. 4, that is, at the timings of the switching operations, or at around the timings of the switching operations, to obtain the difference between the currents at the beginning and end of a sub-cycle, and to divide the difference by the period of time of the sub-cycle. In this respect, the current change ratio obtainer 11 may measure the current at a timing shifted forward or backward from the timing at which one sub-cycle is switched to another sub-cycle. This is because noise occurs at the moment of the switching, to the detriment of the accuracy of measuring the current. Another possible example is that the current change ratio obtainer 11 directly measures the change ratios of currents passing through the winding coils of the stator 21.

While in the first embodiment $\zeta_{th}=0.5$, it is also possible that $\zeta_{th}<0.5$. That is, when the space vector generator 10 controls the sum of the voltage application time periods for the opposite directions to be equal to or longer than a predetermined time period, the predetermined time period may be shorter than half one control cycle.

Although the "$\zeta_{th}<0.5$" configuration necessitates a zero-voltage vector(s) in one control cycle, the total current necessary for driving the AC electric motor 2 reduces. This leads to the presumption that the "$\zeta_{th}<0.5$" configuration provides an effect of reducing consumption of the current involved in driving the AC electric motor 2.

In the first embodiment, all the voltage vectors generated by the space vector generator 10 are orientated in any of the phase directions of the stator 21 of the AC electric motor 2 and the opposite directions of the phase directions. This configuration, however, is not intended in a limiting sense.

A second embodiment will be described below. In the second embodiment, the voltage vectors generated by the space vector generator 10 are not oriented in any of the phase directions of the stator 21 of the AC electric motor 2 and the opposite directions of the phase directions. Also in the second embodiment, the directions of the voltage vectors generated by the space vector generator 10 are orthogonal to each other and parallel to the α axis direction and the β axis direction. The rotation controller 1 according to the second embodiment is similar to in configuration to the rotation controller 1 according to the first embodiment and will not be elaborated here.

Figure 6:
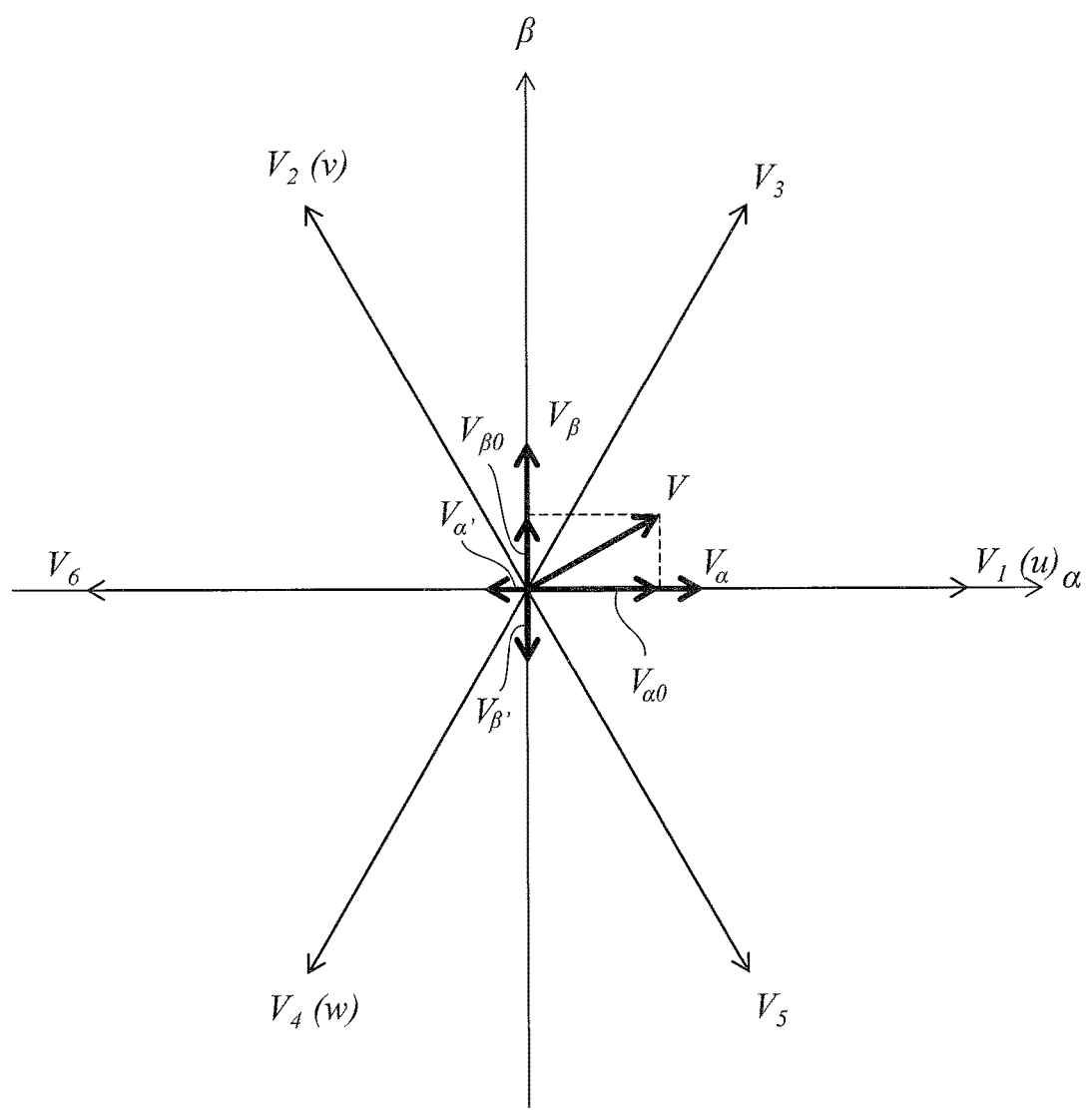
FIG. 6 illustrates voltage vectors $V_\alpha$, $V_\beta$, $V_\alpha'$, and $V_\beta'$, which are generated by a space vector generator of a rotation controller according to a second embodiment on an $\alpha$-$\beta$ plane.

FIG. 6 illustrates voltage vectors $V_\alpha$, $V_\beta$, $V_\alpha'$, and $V_\beta'$, which are generated by the space vector generator 10 on an α-β plane. In the embodiment of FIG. 6, the space vector generator 10 selects two adjacent voltage vectors, from among the voltage vectors $V_\alpha$, $V_\beta$, $V_\alpha'$, and $V_\beta'$, between which the space voltage vector V is held. The space vector generator 10 regards these voltage vectors as a first direction and a second direction in which to generate magnetic fields, regards the opposite direction of the first direction as a third direction, and regards the opposite direction of the second direction as a fourth direction. In the embodiment of FIG. 6, the space voltage vector V is located in the first quadrant of the α-β coordinate system, with the first direction being a direction, the second direction being β direction, the opposite direction of the first direction being α' direction, and the opposite direction of the second direction being β' direction.

Then, the space vector generator 10 decomposes the space voltage vector V into $V_{\alpha 0}$ and $V_{\beta 0}$. $V_{\alpha 0}$ is a voltage vector component in the a direction, and $V_{\beta 0}$ is a voltage vector component in the β direction. Then, the space vector generator 10 uses Equation 18, mentioned in the first embodiment, to obtain $V_\alpha$, $V_\beta$, $V_\alpha'$, and $V_\beta'$. This configuration ensures, in the second embodiment as well, that when $\zeta_{th}=0.5$, the sum of the voltage application time periods for the opposite directions is half one control cycle.

The voltage vectors $V_\alpha$ and $V_\alpha'$ are parallel to the u phase direction of the stator 21 of the AC electric motor 2. This enables the voltage vectors $V_\alpha$ and $V_\alpha'$ to be obtained by applying voltage to the u phase winding coil or by applying voltage to the v phase winding coil and the w phase winding coil. In contrast, the voltage vectors $V_\beta$ and $V_\beta'$ are not oriented in any of the winding coil phase directions. In view of this situation, the space vector generator 10 decomposes the voltage vector $V_\beta$ into $V_3$ direction and $V_2$ direction, and synthesizes the voltage vector $V_3$ and the voltage vector $V_2$ into a synthesized vector of the voltage vector $V_\beta$. Thus, the space vector generator 10 obtains the voltage vector $V_\beta$ in the form of a synthesized vector of the voltage vector $V_\beta$. Similarly, the space vector generator 10 decomposes the voltage vector $V_\beta'$ into $V_4$ direction and $V_5$ direction, and synthesizes the voltage vector $V_4$ and the voltage vector $V_5$ into a synthesized vector of the voltage vector $V_4$ and the voltage vector $V_5$. Thus, the space vector generator 10 obtains the $V_\beta'$ in the form of a synthesized vector of the voltage vector $V_4$ and the voltage vector $V_5$. In this configuration, the following equations hold true.

$$|V_3| = |V_2| = \frac{\sqrt{3}}{2}|V_\beta|$$
$$|V_4| = |V_5| = \frac{\sqrt{3}}{2}|V_{\beta'}|$$
Equation 22

Thus, the space vector generator 10 obtains the magnetic field(s) oriented in at least one of the first direction and the second direction in the form of a synthesized magnetic field of magnetic fields generated on the winding coils of the plurality of phases. In this configuration as well, the current change ratio obtainer 11 obtains the current change ratios $di_{x,y}/dt$ in the first direction and the second direction, enabling the rotational angle θ of the rotor 20 to be obtained.

Specifically, the above-described Equation 4 can be solved for the sub-cycle α as follows.

$$\frac{d}{dt}\begin{bmatrix} i_{\alpha,\alpha} \\ i_{\alpha,\beta} \end{bmatrix} = \frac{V_{h\alpha}}{L^2 - l^2}\begin{bmatrix} L - l\cos 2\theta \\ -l\sin 2\theta \end{bmatrix}$$
Equation 23

Also, Equation 4 can be solved for the sub-cycle β as follows.

$$\frac{d}{dt}\begin{bmatrix} i_{\beta,\alpha} \\ i_{\beta,\beta} \end{bmatrix} = \frac{V_{h\beta}}{L^2 - l^2}\begin{bmatrix} -l\sin 2\theta \\ L + l\cos 2\theta \end{bmatrix}$$
Equation 24

From Equations 23 and 24, the current change ratios $di_{x,y}/dt$ in the a direction and the β direction are obtained in each of the sub-cycle α and the sub-cycle β. Then, the rotational angle θ is obtained by the following equation.

$$\theta = \frac{1}{2}\tan^{-1}\frac{\frac{1}{V_{h\alpha}}\frac{di_{\alpha,\beta}}{dt} + \frac{1}{V_{h\beta}}\frac{di_{\beta,\alpha}}{dt}}{\frac{1}{V_{h\alpha}}\frac{di_{\alpha,\alpha}}{dt} - \frac{1}{V_{h\beta}}\frac{di_{\beta,\beta}}{dt}}$$
Equation 25

$V_{h\alpha}$ is represented as follows.

$$V_{h\alpha} = \zeta_\alpha(|V_\alpha| + |V_{\alpha'}|), V_{h\oplus} = \zeta_\beta(|V_{\beta'}|)$$
Equation 26:

This proves that the rotational angle θ of the rotor 20 is obtained by causing the current change ratio obtainer 11 to obtain the current change ratios $di_{x,y}/dt$ in the first direction and the second direction.

Equation 25 is used to obtain the rotational angle θ from the current change ratios $di_{x,y}/dt$ in the first direction and the second direction. In this respect, the β direction, which corresponds to the second direction, is not oriented in any of the phase directions of the stator 21 of the AC electric motor 2 and the opposite directions of the phase directions, as described above. This necessitates the current change ratio, $di_{x,\beta}/dt$, in the second direction being obtained by converting the current change ratio in the $V_3$ direction, that is, the change ratio of a synthesized current of the currents through the it phase winding coil and the v phase winding coil, and converting the current change ratio in the $V_2$ direction, that is, the change ratio of the current through the v phase winding coil based on the β direction, which corresponds to the second direction. Also as described above, the space voltage vector V is in the first quadrant of the α-β coordinate system. If the space voltage vector V is in the second quadrant, the β direction corresponds to the first direction. This necessitates the current change ratio, $di_{x,\beta}/dt$, in the first direction being obtained by a conversion based on the β direction, which corresponds to the first direction. Thus, Equation 25 is solved based on the first direction and the second direction.

Figure 7:
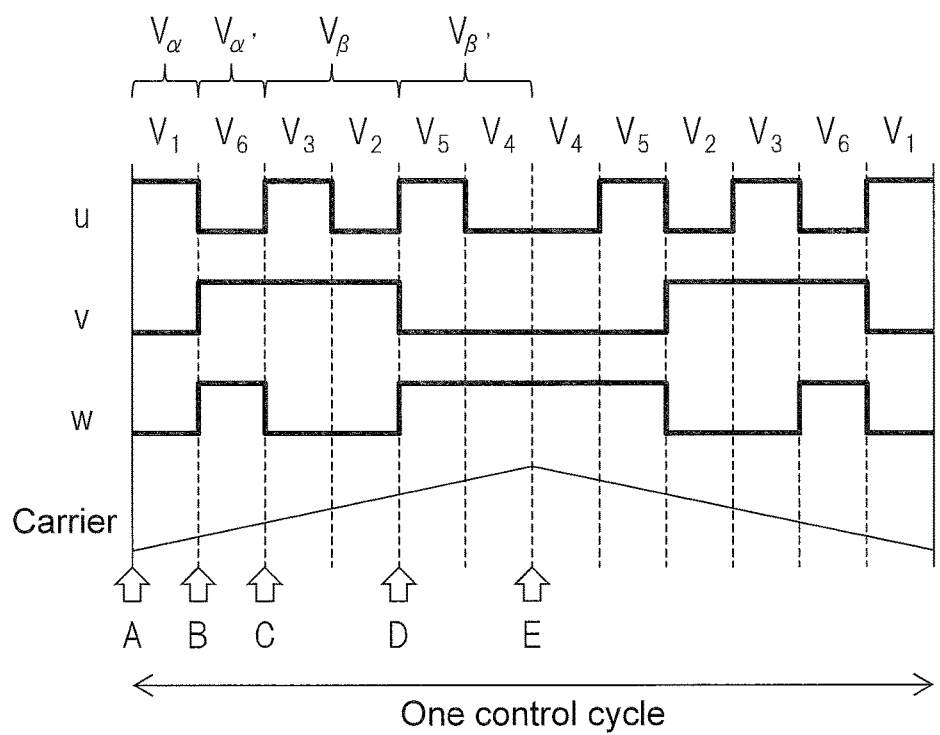
FIG. 7 illustrates, in comparison with a triangular wave carrier, exemplary patterns of voltages that the space vector generator according to the second embodiment applies to the winding coils of the u phase, the v phase, and the w phase in one control cycle.

FIG. 7 illustrates, in comparison with a triangular wave carrier, exemplary patterns of voltages that the space vector generator 10 of the rotation controller 1 according to the second embodiment applies to the winding coils of the u phase, the v phase, and the w phase in one control cycle.

As illustrated in FIG. 7, one control cycle is divided into four sub-cycles. It is noted, however, that the use of a triangular wave carrier makes each half one control cycle a mirror image of the other half in the arrangement of the sub-cycles. The voltage vector $V_\beta$ in the sub-cycle $\beta$ is a synthesized vector of the voltage vectors $V_3$ and $V_2$. The voltage vector $V_\beta'$ in the sub-cycle $\beta'$ is a synthesized vector of the voltage vectors $V_5$ and $V_4$. In this configuration, it is necessary to obtain current change ratios $di_{x, y}/dt$ in the sub-section $\alpha$ and the sub-section $\beta$.

In the second embodiment, at timings A to E illustrated in FIG. 7, the current change ratio obtainer 11 measures the currents occurring through the winding coils. The current change ratio in the sub-cycle $\alpha$ is obtained by dividing the difference between the currents measured at timing A and timing B by the period of time of the sub-cycle $\alpha$. Another possible method of obtaining the current change ratio is to arrange next to each other the sub-cycle $\alpha$ and the sub-cycle $\alpha'$, in which voltage vectors are generated in mutually opposite directions, and to obtain the average of current change ratios between timing A and timing C, which correspond to the beginning and end of the sub-cycle $\alpha$ and the sub-cycle $\alpha'$. Using the average ensures a more accurate current change ratio. The same applies in the sub-cycle $\beta$. While it is possible to obtain the current change ratio based on the sub-cycle $\beta$ alone, it is also possible to arrange next to each other the sub-cycle $\beta$ and the sub-cycle $\beta'$, in which voltage vectors are generated in mutually opposite directions, and to obtain the average of current change ratios between timing C and timing E, which correspond to the beginning and end of the sub-cycle $\beta$ and the sub-cycle $\beta'$.

As described hereinbefore in the second embodiment, the voltage vectors generated by the space vector generator 10 may not necessarily be oriented in the directions of the phases of the winding coils of the stator 21 of the AC electric motor 2 or in the opposite directions of the phase directions. Instead, each voltage vector may be generated in the form of a synthesized vector. This configuration of the second embodiment ensures that the calculation represented by Equation 24 to obtain the rotational angle $\theta$ of the rotor 20 remains unchanged in applications where the number of phases of the AC electric motor 2 is other than three, such as four or more phases. Thus, since the current change ratio obtainer 11 is capable of obtaining current change ratios in any desired first and second directions, the rotational angle $\theta$ of the rotor 20 is obtained regardless of the type of the AC electric motor 2 without significant changes to the rotational angle calculator 12.

Also in the second embodiment, the directions of the voltage vectors generated by the space vector generator 10 are orthogonal to each other. This configuration simplifies the equation (Equation 25) to derive the rotational angle $\theta$ of the rotor 20.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A rotation controller for an AC electric motor, the rotation controller comprising:
    a space vector generator to generate a first magnetic field in a first direction in a rotation plane of a saliency-exhibiting rotor and a second magnetic field in a second direction in the rotation plane of the saliency-exhibiting rotor crossing the first direction in the rotation plane of the saliency-exhibiting rotor of the AC electric motor and to synthesize the first magnetic field and the second magnetic field into a synthesized magnetic field so as to generate a space vector of the synthesized magnetic field;
    a current change ratio obtainer to acquire a first current change ratio of a first current generated for the first direction in a stator of the AC electric motor and a second current change ratio of a second current generated for the second direction in the stator; and
    a rotational angle calculator to calculate a rotational angle of the saliency-exhibiting rotor based on at least the first current change ratio, the second current change ratio, the first direction, and the second direction,
    wherein in one cycle, the space vector generator is configured to generate a magnetic field in a third direction opposite to the first direction and configured to generate a magnetic field in a fourth direction opposite to the second direction, and
    wherein in the one cycle, the space vector generator is configured to apply a voltage to the stator to make a level of a voltage vector difference between a voltage vector in the first direction and a voltage vector in the third direction equal to or higher than a predetermined level and to make a level of a voltage vector difference between a voltage vector in the second direction and a voltage vector in the fourth direction equal to or higher than the predetermined level.

2. The rotation controller according to claim 1, wherein in the one cycle, the space vector generator is configured to apply a voltage to the stator on a time division basis to make a sum of voltage application time periods for opposite directions among the first direction, the second direction, the third direction, and the fourth direction equal to or longer than a predetermined time period.

3. The rotation controller according to claim 2, wherein the predetermined time period is shorter than half the one cycle.

4. The rotation controller according to claim 2,
    wherein the stator comprises winding coils of equal to or more than three phases, and
    wherein the first direction and the second direction are two adjacent directions among phase directions of the stator and opposite directions opposite to the phase directions.

5. The rotation controller according to claim 3,
    wherein the stator comprises winding coils of equal to or more than three phases, and
    wherein the first direction and the second direction are two adjacent directions among phase directions of the stator and opposite directions opposite to the phase directions.

6. The rotation controller according to claim 2, wherein the first direction and the second direction are orthogonal to each other.

7. The rotation controller according to claim 2, wherein the predetermined time period is half the one cycle.

8. The rotation controller according to claim 7,
    wherein the stator comprises three-phase winding coils,
    wherein the one cycle comprises sub-cycles obtained by time-dividing the one cycle, wherein in each of the sub-cycles, the space vector generator is configured to switch on and off application of a voltage to each of the phase winding coils of the stator, and wherein after the application of the voltage to each of the phase winding coils has been switched between a first sub-cycle among the sub-cycles and a second sub-cycle next to the first sub-cycle, the application of the voltage remains unswitched between the second sub-cycle and a third sub-cycle next to the second sub-cycle.

9. The rotation controller according to claim 8,
wherein the stator comprises winding coils of equal to or more than three phases, and
wherein the first direction and the second direction are two adjacent directions among phase directions of the stator and opposite directions opposite to the phase directions.

10. The rotation controller according to claim 7,
wherein the stator comprises winding coils of equal to or more than three phases, and
wherein the first direction and the second direction are two adjacent directions among phase directions of the stator and opposite directions opposite to the phase directions.

11. The rotation controller according to claim 1,
wherein the stator comprises winding coils of equal to or more than three phases, and
wherein the first direction and the second direction are two adjacent directions among phase directions of the stator and opposite directions opposite to the phase directions.

12. The rotation controller according to claim 1, wherein the first direction and the second direction are orthogonal to each other.

13. The rotation controller according to claim 12,
wherein the stator comprises winding coils of equal to or more than three phases, and
wherein at least one direction of the first direction and the second direction is obtained based on the synthesized magnetic field of magnetic fields of the winding coils.

14. A method for controlling rotation of an AC electric motor, the method comprising:
generating a first magnetic field in a first direction in a rotation plane of a saliency-exhibiting rotor and a second magnetic field in a second direction in the rotation plane of the saliency-exhibiting rotor crossing the first direction in the rotation plane of the saliency-exhibiting rotor of the AC electric motor;
generating a third magnetic field in a third direction opposite to the first direction and a fourth magnetic field in a fourth direction opposite to the second direction;
synthesizing the first magnetic field and the second magnetic field into a synthesized magnetic field so as to generate a space vector of the synthesized magnetic field;
acquiring a first current change ratio of a first current generated for the first direction in a stator of the AC electric motor and a second current change ratio of a second current generated for the second direction in the stator; and
calculating a rotational angle of the saliency-exhibiting rotor based on at least the first current change ratio, the second current change ratio, the first direction, and the second direction,
wherein in one cycle, a voltage is applied to the stator to make a level of a voltage vector difference between a voltage vector in the first direction and a voltage vector in the third direction equal to or higher than a predetermined level and to make a level of a voltage vector difference between a voltage vector in the second direction and a voltage vector in the fourth direction equal to or higher than the predetermined level.

15. A rotation controller for an AC electric motor, comprising:
circuitry configured to
generate a first magnetic field in a first direction in a rotation plane of a saliency-exhibiting rotor and a second magnetic field in a second direction in the rotation plane of the saliency-exhibiting rotor crossing the first direction in the rotation plane of the saliency-exhibiting rotor of the AC electric motor and to synthesize the first magnetic field and the second magnetic field into a synthesized magnetic field so as to generate a space vector of the synthesized magnetic field,
acquire a first current change ratio of a first current generated for the first direction in a stator of the AC electric motor and a second current change ratio of a second current generated for the second direction in the stator, and
calculate a rotational angle of the saliency-exhibiting rotor based on at least the first current change ratio, the second current change ratio, the first direction, and the second direction,
wherein in one cycle, the circuitry is configured to generate a magnetic field in a third direction opposite to the first direction and configured to generate a magnetic field in a fourth direction opposite to the second direction, and
wherein in the one cycle, the circuitry is configured to apply a voltage to the stator to make a level of a voltage vector difference between a voltage vector in the first direction and a voltage vector in the third direction equal to or higher than a predetermined level and to make a level of a voltage vector difference between a voltage vector in the second direction and a voltage vector in the fourth direction equal to or higher than the predetermined level.

* * * * *